United States Patent
Penn et al.

[19]

[11] Patent Number: 5,923,022

[45] Date of Patent: Jul. 13, 1999

[54] METHOD AND APPARATUS FOR IDENTIFYING BAR CODE SYMBOLS USING READING GATES

[75] Inventors: Richard S. Penn, Issaquah; Pavel A. Maltsev, Edmonds, both of Wash.

[73] Assignee: Intermec IP Corp., Beverly Hills, Calif.

[21] Appl. No.: 08/838,005

[22] Filed: Apr. 14, 1997

[51] Int. Cl.$^6$ .............................. G06K 7/10; G06K 13/00
[52] U.S. Cl. .................. 235/462.08; 235/470; 235/454; 235/459; 235/462.01
[58] Field of Search .................... 235/462, 470, 235/471, 472, 454, 459, 463, 462.01, 462.08, 462.24

[56] References Cited

U.S. PATENT DOCUMENTS

| | | | |
|---|---|---|---|
| 4,369,361 | 1/1983 | Swartz et al. ............................ | 235/470 |
| 5,296,690 | 3/1994 | Chandler et al. ........................ | 235/462 |
| 5,343,028 | 8/1994 | Figarella et al. ........................ | 235/462 |
| 5,756,981 | 5/1998 | Roustaei et al. ........................ | 235/462 |
| 5,773,807 | 6/1998 | Barkan et al. ........................... | 235/462 |
| 5,773,811 | 6/1998 | Shramm, Jr. et al. ................... | 235/472 |
| 5,777,309 | 7/1998 | Maltsev et al. .......................... | 235/462 |

*Primary Examiner*—Donald Hajec
*Assistant Examiner*—Daniel St. Cyr
*Attorney, Agent, or Firm*—Graham & James LLP

[57] ABSTRACT

A bar code symbol reading system includes a memory for storing a plurality of reading gate locations, each reading gate location defining coordinates for a reading gate area surrounding one of the bar code symbols. The memory also stores a lookup table containing an identifier for the object and a pointer to configuration data relating each reading gate for the object to a specific component on the object. The object is scanned by a charge-coupled device scanner for scanning each bar code symbol according to the stored reading gate locations. A processor determines the identifier for each object and relates each read bar code symbol to a component on the object based on the configuration data.

24 Claims, 4 Drawing Sheets

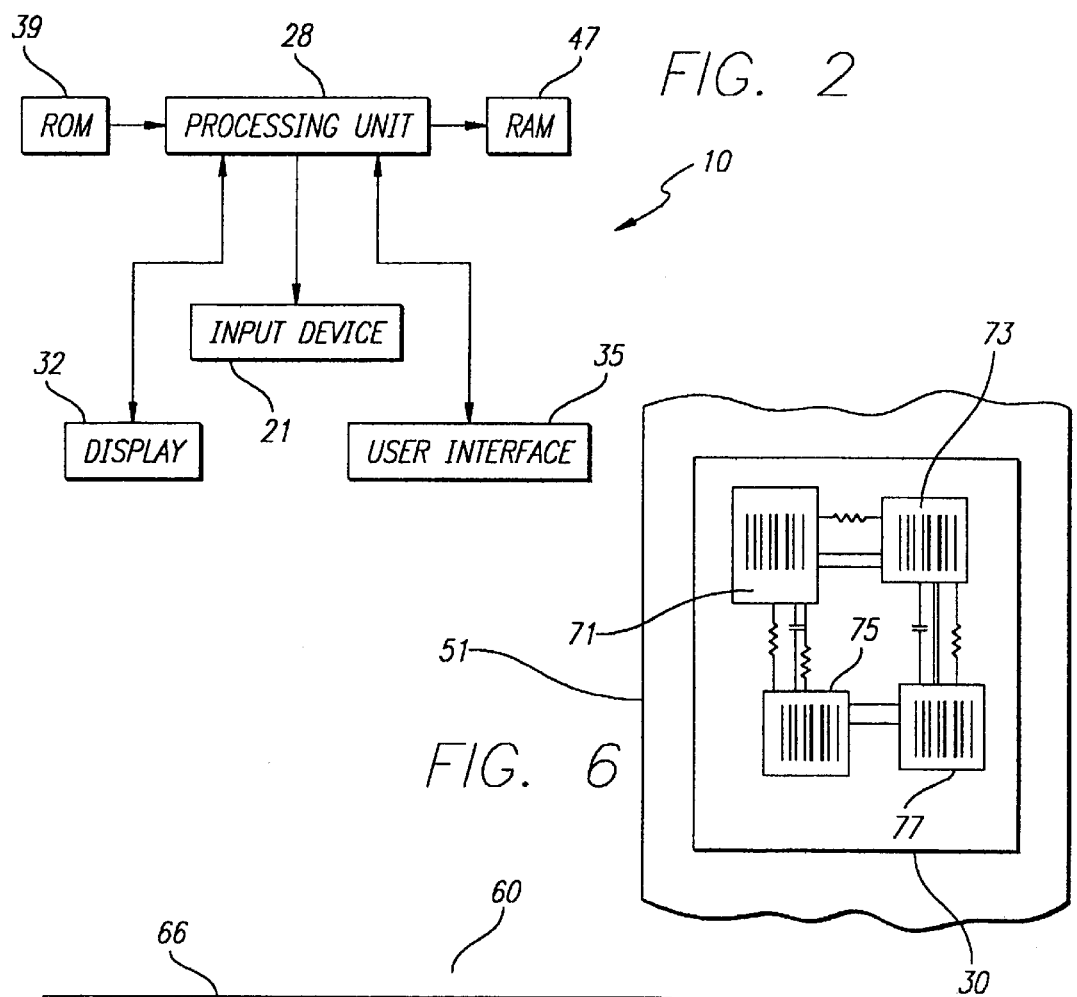
FIG. 2
FIG. 6
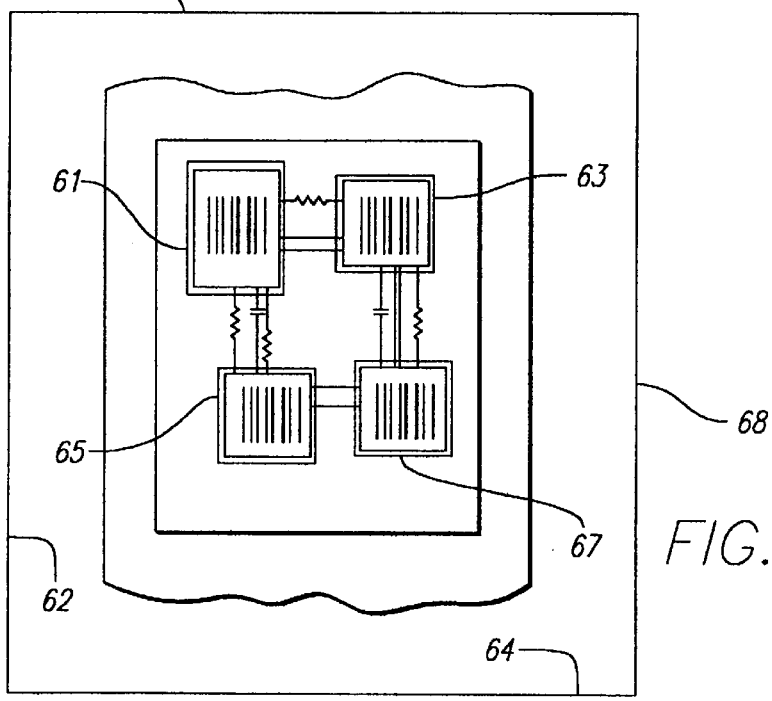
FIG. 4

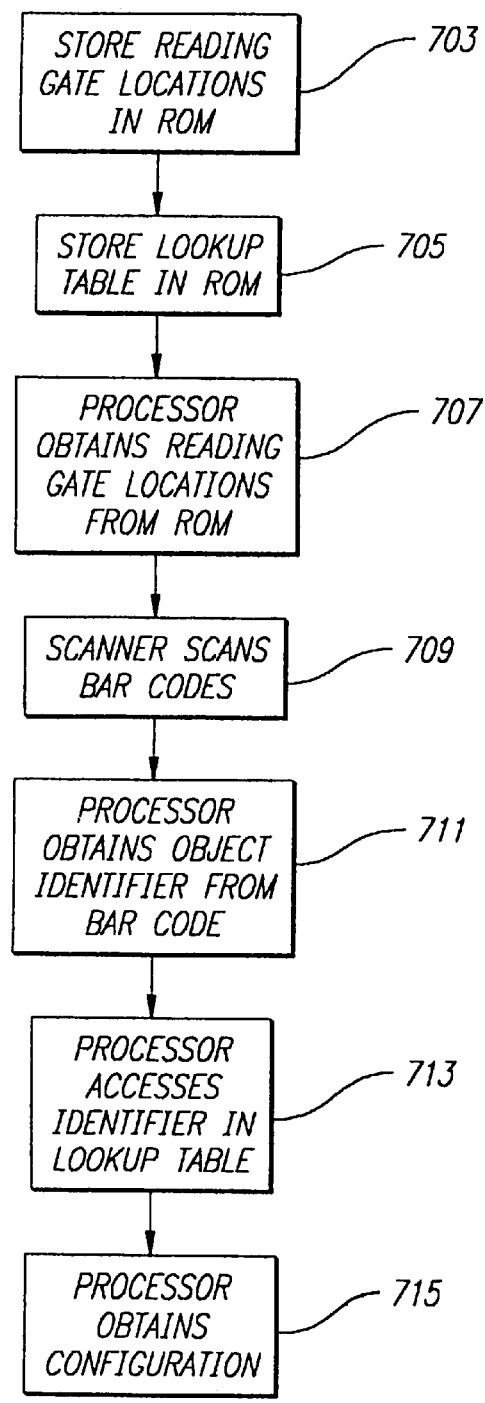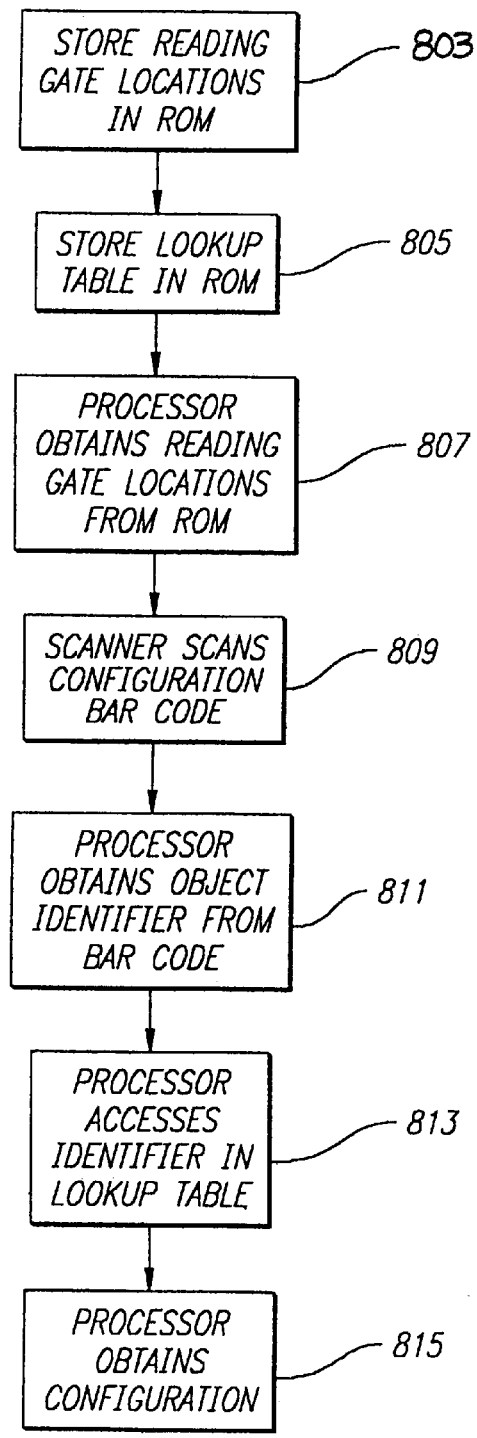

METHOD AND APPARATUS FOR IDENTIFYING BAR CODE SYMBOLS USING READING GATES

BACKGROUND OF THE INVENTION

1. Field of the Invention

The present invention relates to a method and apparatus for reading multiple bar codes arranged in a fixed order on various components of an object, such as a circuit card. Specifically, the field of view of a bar code scanner is arranged into several fixed areas that enclose bar codes, termed "reading gates". The relationship between each reading gate and a specific component is termed a "configuration". By storing all possible configurations in memory, a processor can then build a pre-defined output data stream for all of the bar codes on a scanned object.

2. Background

It is increasingly commonplace within industry to utilize bar code symbols printed on objects in order to identify the objects and convey information regarding the objects. A conventional bar code symbol comprises a pattern of vertical bars of various widths separated by spaces of various widths. The modulated widths of the bar and space elements can be interpreted by an electro-optical imaging system that converts the symbols into an electrical signal, which is then decoded to provide an alphanumeric representation of the bar code symbol. Bar code symbology of this nature are commonly used in various applications, such as inventory control, point of sale identification, or logistical tracking systems.

The electro-optical imaging system typically uses light from a light source that is scanned across the bar code field. Since the bar code symbology is often disposed on the object to be identified, it is desirable for the reader to be included in a hand-held or portable device so that the reader can be brought to the object. The operator can physically move the light source across the bar code field, such as by use of a light pen. Alternatively, a bar code reader may include movable mirrors that automatically articulate light from a laser back and forth at a high rate to scan across the bar code field. The operator would normally be provided with a feedback signal, such as an audible tone, that alerts the operator as to the successful completion of a bar code reading operation.

Alternatively, electro-optical imaging systems can convert the entire bar code symbol into pixel information that is deciphered into the alphanumeric information represented by the symbol. Such imaging systems typically utilize charge-coupled device ("CCD") technology to convert the optical information from the bar code symbol into an electrical signal representation of the symbol. CCD-based electro-optical imaging systems are preferable over laser-based imaging systems since the CCD does not require any moving elements, and is further adaptable to image advanced types of symbologies, such as two-dimensional codes, that could not be easily collected by an articulated laser. An image of the bar code symbol is optically transferred to a linear or two-dimensional array of multiple adjacent photodiodes that comprise the CCD device, with each one of the photodiodes defining a distinct picture element (or "pixel") of the array. The CCD array is scanned electrically by activating the individual photodiodes in a sequential manner.

In certain scanning applications, a single bar code symbol alone does not convey enough information to the user. For instance, a printed circuit card may contain numerous bar code symbols affixed to specific components of the card. Each bar code symbol may include serial number information for the corresponding component. If the user needs to determine the serial number for a specific component on the card, however, the scanning process does not produce a sufficient output stream of data. Instead, the data output stream includes a set of serial numbers arranged in an order unknown to the user.

One method for solving this problem is to determine the arrangement of components (the "configuration") on the circuit card prior to scanning the card and modify the hardware of the scanner accordingly. Unfortunately, each circuit card may have a different configuration. Usually, the configuration varies according to the manufacturer of the card. Among manufacturers, the configuration may be further varied according to a model number. Thus, for each possible configuration, a different scanner must be used to obtain information about specific components. This method of scanning is extremely expensive and inefficient.

Accordingly, a need exists for a method and apparatus for scanning multiple bar code symbols arranged in a fixed order on an object.

Further, a need exists for a method and apparatus for ascertaining specific bar code information from an object without requiring the use of multiple scanners.

SUMMARY OF THE INVENTION

The present invention is directed to a system that satisfies the need for scanning multiple bar code symbols arranged in a fixed order on an object. The present invention further satisfies the need for ascertaining specific bar code information from an object without requiring the use of multiple scanners.

In a preferred embodiment, the bar code reading system of the present invention reads bar code symbols arranged in a fixed order on various components of an object to be scanned. The system of the present invention uses a charge-coupled device scanner, a volatile memory unit ("RAM"), a non-volatile memory unit ("ROM"), and a processor. The CCD scanner has a field of view defining the area of the object to be imaged. The field of view is divided into coordinates defining horizontal and vertical positions within the field of view. The ROM stores the coordinate locations for each "reading gate"—an area surrounding a bar code on the object. The ROM also stores a lookup table containing an identifier for each object (e.g., a serial number) and a pointer to configuration data for the object. The configuration data relates each reading gate on that object to a specific component on the object. Each object is identified by its position in a sequence of other objects. Thus, a first set of objects will have one configuration, while a following set of objects may have another.

Alternatively, the first bar code symbol in the scanner's field of view may be encoded with the identifier for the object. The object may include only the encoded bar code symbol or may be a "dummy" object used to signal a configuration for successive objects.

The use of reading gates facilitates the reading of multiple bar code symbols disposed in fixed places on an object. By storing the reading gate locations and configurations for an object, the system can easily read the bar code symbols and associate a specific gate with that bar code. Multiple scanners are not required to make this association. Moreover, the present invention reduces the need for additional processing power required to locate bar codes over a large field of view. By storing or ascertaining the locations of each bar code symbol, the system does not need to search the entire image for these symbols. This feature is particularly useful when an object includes features other than bar codes, such as pins on integrated circuits, traces on circuit cards, and text on mail pieces or packages.

A more complete understanding of the bar code symbol reading system will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 2 is a system diagram of a bar code symbol reading system of the present invention.

FIG. 4 is an illustration of a field of view of a scanner used in the reading system.

FIG. 6 is an illustration of a circuit card used in a second embodiment of the reading system.

FIG. 7 is a flow chart of steps performed in the second embodiment of the reading system.

FIG. 8 is a flow chart of steps performed in a third embodiment of the reading system.

DETAILED DESCRIPTION OF THE PREFERRED EMBODIMENT

The present invention satisfies the need for a method and apparatus for ascertaining specific bar code information from an object without requiring the use of multiple scanners. In the detailed description that follows, it should be understood that like element numerals are used to describe like elements of one or more of the figures.

Figure 1:
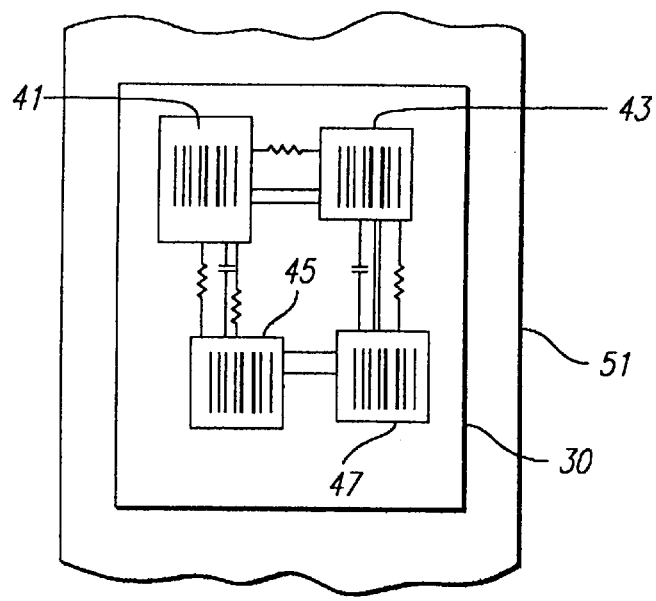
FIG. 1 is an illustration of a circuit card containing bar code symbols.

FIG. 1 illustrates an object 30, such as a circuit card, having multiple bar code symbols 41, 43, 45, 47 printed on labels affixed to various components thereof. Although a circuit card is shown, it should be understood that any other object having bar code symbols may be used including, but not limited to, integrated circuits and mail. Each bar code 41, 43, 45, 47 represents specific information (such as a serial or model number) for the corresponding component. The bar code symbols illustrated in FIG. 1 use a one-dimensional symbology, although it should be readily apparent that the reader of the present invention may be used with two-dimensional symbologies as well. The circuit card 30 is one of several cards to be read. Each of the cards is situated along a moving conveyor belt 51 (see FIG. 3). The conveyor belt 51 transports cards, one at a time, past the reading system of the present invention.

A system diagram of the bar code reading system 10 is illustrated in FIG. 2. The system 10 includes an input device 21 such as a scanner or charge-coupled device, a processor 28, a display 32, a user interface 35, such as a keypad or other input/output device, non-volatile memory storage 39 such as a read-only memory ("ROM"), and a volatile memory storage 47, such as a random-access memory ("RAM"). Arrows indicate devices in electrical connection with each other. Temporary information or data that must be stored during execution of scanning instructions is stored in addresses contained in RAM 47. More permanent information, or data that will be utilized during each scan is stored in ROM 39.

Figure 3:
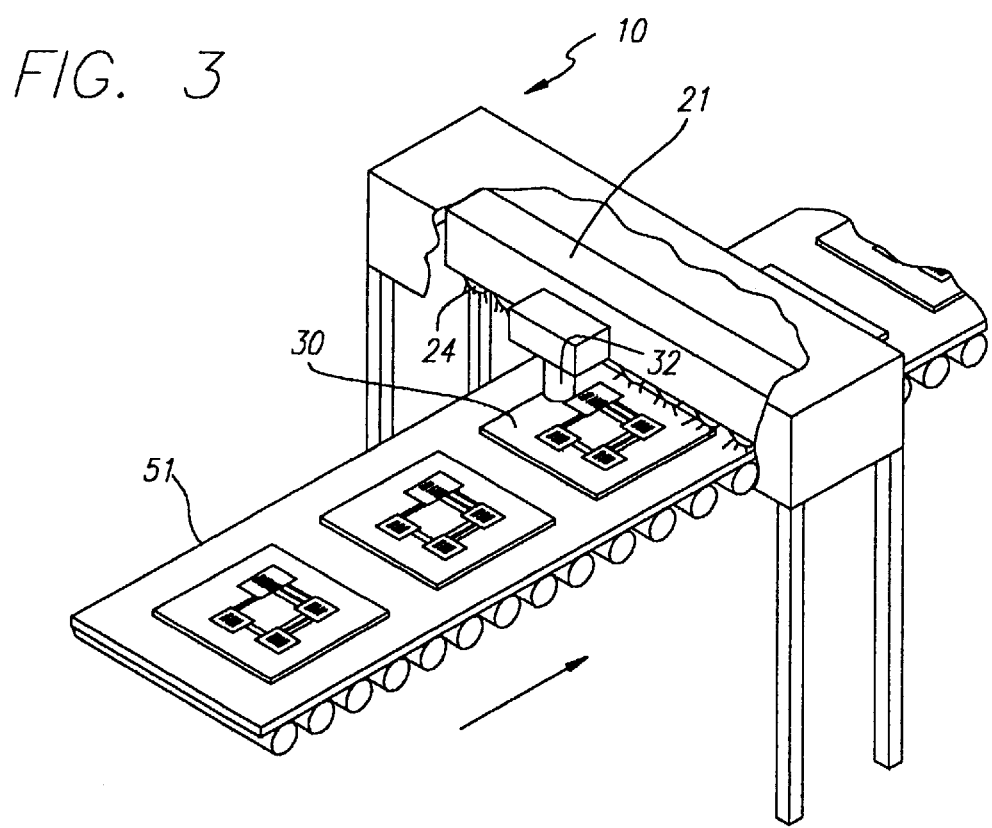
FIG. 3 is an illustration of an over-belt scanner used in the reading system of the present invention.

Preferably, an over-the-belt charge-coupled device scanner, such as that employed in Intermec's 7280 Wide Area Bar Code Reader, is utilized as the input device 21. Each circuit card 30 is placed upon the conveyor belt 51 which then moves the card 30 past a stationary flood illumination scheme 24, such as a series of halogen lamps, as shown in FIG. 3. The light reflected from the bar code symbol 41 is reflected back through a lens of the CCD camera 32 and transferred to a photodiode array (not shown). The over-the-belt CCD scanner enables omnidirectional scanning of large objects over a wide area. The scanner is capable of reading multiple bar code symbols within its large field of view.

FIG. 4 shows a sample field of view 60 of the CCD scanner while reading a circuit card. The field of view is defined by horizontal view lines 64, 66 and vertical view lines 62, 68. To facilitate the reading of multiple bar code symbols on a single circuit card, the field of view 60 is partitioned into a plurality of coordinates (not shown), with each coordinate defining a horizontal and vertical position within the field of view 60. For purposes of this discussion, the origin (0,0) coordinate is assumed to be the intersection of horizontal line 62 and vertical line 64, although the origin may be located at any point within the field of view 60. The scanner can locate bar code symbols on the circuit card by scanning an area within the field of view 60 surrounding each bar code symbol. This area is termed the "reading gate" of the bar code symbol. The bar code symbols 41, 43, 45, and 47 are surrounded by reading gates 61, 63, 65, and 67 respectively. Each reading gate is defined by four coordinates: the horizontal and vertical coordinates of the lower left corner of the reading gate and the horizontal and vertical coordinates of the upper right corner of the reading gate. In this embodiment, the coordinates for every reading gate and the number of reading gates for every type of circuit card to be read are stored in the ROM 39 prior to scanning. In addition, each reading gate is assigned an identifier that is stored together with the coordinates. During the scanning process, the coordinates and the reading gate identifier are read out from memory by the processor and used to determine and identify the areas to be scanned. The processor decodes each bar code symbol using known decoding algorithms also stored in ROM 39.

A photodetector 53 coupled to the reader 10 adjacent the flood illumination scheme 24 senses an object that enters the scanner's field of view 60. The photodetector 53 includes a light-emitting portion, a detecting portion, such as a photodiode, and a reflector. The light emitting portion emits a beam of light onto the conveyor belt 51. The light is reflected by a reflector disposed in an opening in the conveyor belt 51 and returns along a path leading to the detecting portion. When a circuit card enters the scanner's field of view, the beam is temporarily interrupted. Thus, the beam does not reflect and return to the detecting portion. The detecting portion senses that no light has been reflected and conveys this information to the processor. The scanner uses this information to determine that a new circuit card is within its field of view. The scanner 21 also uses this information to count the number of cards that have passed before it.

To determine the actual configuration, i.e., the correspondence between a specific component and a specific reading gate, the reading system of the present invention stores a lookup table in ROM 39. The lookup table includes an identifier, such as a serial number, representing an object and a pointer to the configuration data for that identifier. A circuit card manufacturer may, for example, have ten models, each having a different configuration. The table in ROM, therefore, would store ten entries, with each entry including an integer for storing the serial number and a pointer to configuration data for each number. The configuration data for a specific identifier would include each reading gate identifier and the name of the corresponding component for that reading gate (e.g., "Central Processing Unit," "Potentiometer"). In this manner, the processor 28 may easily correlate a read bar code symbol to a specific component. It should be noted that an identifier other than the name of the component may be used.

Figure 5:
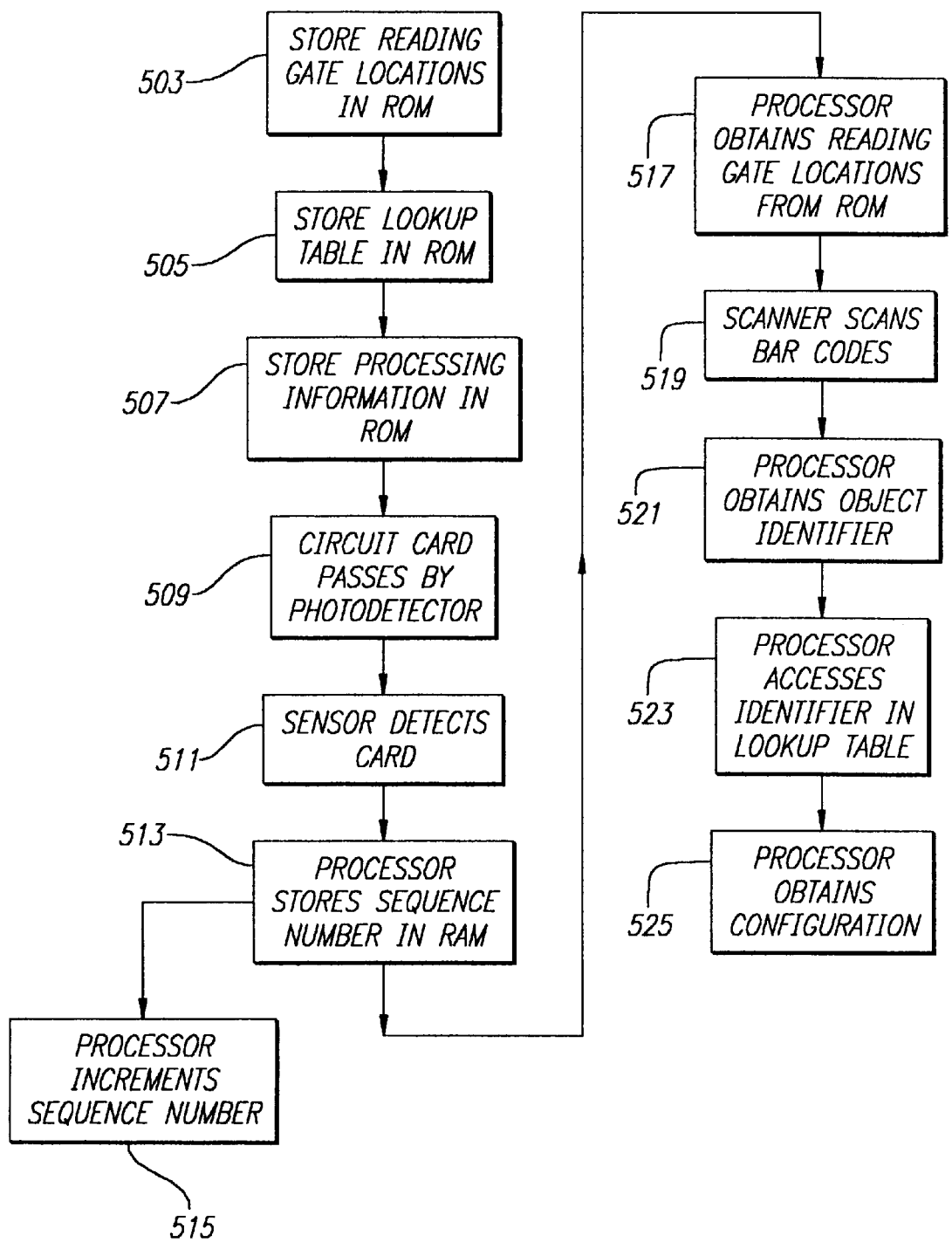
FIG. 5 is a flow chart of steps performed by the reading system.

FIG. 5 shows sample steps performed by the present invention during the reading of multiple bar code symbols arranged on a circuit card. Each bar code symbol is arranged within a predefined reading gate area. In a first step 503, the reading gate coordinates and reading gate identifiers for each bar code symbol are stored in ROM 39. In a next step 505, the lookup table containing entries for several models of circuit cards are stored in a separate ROM address. Each entry in the lookup table includes a serial number and a pointer to configuration information that includes the name of the component and its corresponding reading gate identifier. Next, in step 507, processing information is stored in ROM 39. The processing information is used at start-up by the CPU 28 and informs the CPU that the first n number of cards in the overall sequence have a certain serial number (and, therefore, configuration), the second n number of cards in the overall sequence have a second serial number, etc. These first steps are performed prior to the actual scanning of bar code symbols by the reading system.

Next, reading of the circuit cards begins. A circuit card passes before the photodetector 53 in step 509. The sensor, in step 511, detects the card and passes the detection information to the processor. The processor 28 stores a sequence number in RAM 47 which indicates the number of circuit cards that have been scanned. Upon receiving a detect signal from the photodetector 53, the processor 28, in step 515, increments the sequence number. In step 517, the processor 28 determines the location of all reading gates within the field of view 60 by accessing the reading gate information from ROM 39. In step 519, the bar code symbol within each reading gate is scanned by the scanner 21.

The reading gate configuration is determined as follows. In step 521, the processor 28, ascertains the serial number by matching the sequence number of the card to a serial number, as stored in RAM during step 505. In step 523, the processor accesses the entry for that serial number in the configuration table and reads out the configuration data pointed to by in that entry. As discussed above, the configuration information correlates a particular reading gate to a specific component or other circuit-card-specific data on the circuit card. The component name (or other identifier) and its associated decoded bar code information (model number, e.g.) are assembled into an output data stream and stored in RAM 47. The output data stream is now comprehensible and may then be used by the user for subsequent processing. Once the nth circuit card has been read, the processor 28 will access a different entry in the configuration table.

In a second embodiment of the present invention, the first label in the scanner's field of view defines the configuration for that circuit card or sequence of circuit cards. Thus, during pre-processing, the reading gate coordinate data, reading gate identifier, and configuration table are stored in RAM 47. A sample circuit card 60 is shown in FIG. 6. The circuit card includes bar code symbols 71, 73, 75, 77 affixed to certain fixed components and a configuration bar code symbol 71 located proximate an end nearer the scanner.

The processing for the second embodiment is described in the flow chart of FIG. 7. In step 703, the reading gate coordinates and identifiers for each bar code are stored in ROM 39. Next, in step 705, the lookup table is also stored in ROM. The processor 28 obtains the reading gate locations from ROM in step 707. In step 709, the configuration bar code symbol 71 and the remaining bar code symbols are scanned. The bar code symbol 71 is encoded with the serial number for that card. In step 711, the processor 28 obtains the identifier by decoding the bar code symbol 71. The processor then uses the identifier (e.g., serial number) to access the appropriate entry in the configuration table. The configuration data is then accessed and used to relate a reading gate and its bar code with the data contained in that bar code, as discussed above with respect to the first embodiment.

FIG. 8 shows the processing for a third embodiment of the reading system of the present invention. In this embodiment, the processor ascertains the configuration information from a single "configuration" bar code symbol located in a fixed position on a "dummy" circuit card. In step 803, the configuration label reading gate location is stored in ROM. In step 805, the lookup table is stored in ROM. In step 807, the processor 28 obtains the reading gate locations from ROM and, in step 809, the configuration label, only, is read by the scanner according to the pre-loaded reading gate coordinates. The processor 28 decodes the label and stores this information in RAM in step 811. The configuration label contains the serial number for all subsequent circuit cards. In step 813, the processor accesses the identifier in the lookup table and obtains the configuration for subsequent circuit cards. Thus, a new circuit card may be subsequently read and decoded. Since the processor knows the configuration, the step of obtaining the configuration must only be performed once. Once the scanner encounters another circuit card containing a configuration label, the serial number and configuration data changes.

Having thus described a preferred embodiment of a bar code symbol reading system, it should be apparent to those skilled in the art that certain advantages of the within system have been achieved. It should also be appreciated that various modifications, adaptations, and alternative embodiments thereof may be made within the scope and spirit of the present invention. For example, the storage of certain reading gate locations and configuration information in ROM prior to processing has been illustrated, but it should be apparent that this data may also be stored in RAM by the user prior to processing. The invention is further defined by the following claims.

What is claimed is:

1. A system for reading bar code symbols disposed on a component of an object, the system comprising:

a memory for storing a plurality of reading gate locations, each reading gate location defining horizontal and vertical coordinates for a reading gate area surrounding one of the bar code symbols, and for storing a lookup table containing an identifier for the object and a pointer to configuration data relating each reading gate area for the object to a specific component on the object;

a scanner adapted to scan each bar code symbol according to the stored reading gate locations, thereby avoiding a search of an entire image for the bar code symbols; and a processor electrically connected to the memory for determining the identifier for the object and for decoding each bar code symbol and relating each decoded bar code symbol to a component based on the stored configuration data.

2. The system for reading bar code symbols, as recited in claim 1, further comprising a conveying mechanism for conveying the object past the scanner according to a predetermined sequence.

3. The system for reading bar code symbols, as recited in claim 2, wherein the processor determines the identifier for the object based upon the predetermined sequence.

4. The system for reading bar code symbols, as recited in claim 1, wherein the scanner comprises a charge-coupled device scanner.

5. The system for reading bar code symbols, as recited in claim 4, wherein the memory further comprises a read-only memory.

6. The system for reading bar code symbols, as recited in claim 5, wherein the memory further comprises a random-access memory.

7. A system for reading bar code symbols disposed on a component of an object, the system comprising
    a memory for storing a plurality of reading gate locations, each reading gate location defining horizontal and vertical coordinates for a reading gate area surrounding one of the bar code symbols, and for storing a lookup table containing an identifier for the object and a pointer to configuration data relating each reading gate for the object to a specific component on the object;
    a scanner adapted to scan each bar code symbol according to the stored reading gate locations, thereby avoiding a search of an entire image for the bar code symbols; and
    a processor electrically connected to the memory and scanner, the processor decoding each scanned bar code symbol, including a configuration bar code symbol to a component based on the stored configuration data.

8. The system for reading bar code symbols, as recited in claim 7, wherein the scanner comprises a charge-coupled device scanner.

9. The system for reading bar code symbols, as recited in claim 8, wherein the memory further comprises a read-only memory.

10. The system for reading bar code symbols, as recited in claim 9, wherein the memory further comprises a random-access memory.

11. The system for reading bar code symbols, as recited in claim 7, wherein the configuration bar code symbol is a first symbol within a field of view of the scanner.

12. A bar code symbol reading system for reading bar code symbols disposed on a component of an object, the system comprising:
    memory means for storing a plurality of reading gate locations, each reading gate location defining a specific reading gate area surrounding a bar code symbol on the object, and for storing lookup data relating the object to a configuration defining a correspondence between each said reading gate area on the object and a specific component on the object;
    reading means for reading each bar code symbol according to the reading gate locations, thereby avoiding a search of an entire image for the bar code symbols; and
    means for relating each bar code symbol to a component based on the lookup data.

13. The bar code symbol reading system, as recited in claim 12, wherein the reading means further comprises:
    a scanner having a field of view; and
    a processor controlling operation of the scanner.

14. The bar code symbol reading system, as recited in claim 13, wherein each reading gate location further comprises:
    a coordinate defining a lower left corner of the reading gate area within the field of view; and
    a coordinate defining an upper right corner of the reading gate area within the field of view.

15. The bar code symbol reading system, as recited in claim 14, wherein the scanner comprises a charge-coupled device scanner.

16. The bar code symbol reading system, as recited in claim 15 wherein the memory means further comprises a read-only memory.

17. The bar code symbol reading system, as recited in claim 16, wherein the storing means comprises a random-access memory.

18. The bar code symbol reading system, as recited in claim 12, wherein the lookup data further comprises a lookup table containing an identifier for the object and a pointer to configuration data, the configuration data including an identifier for each reading gate and an identifier for each component.

19. The bar code symbol reading system, as recited in claim 13, further comprising:
    a photodetector for sensing a presence of the object within the field of view.

20. The bar code symbol reading system, as recited in claim 19, wherein the photodetector further comprises:
    a light-emitting portion that emits a beam of light;
    a reflector that reflects the beam of light; and
    a detecting portion that detects the reflection of the beam of light.

21. The method for reading bar code symbols, as recited in claim 16, wherein the step of obtaining an identifier for the object further comprises the steps of:
    storing processing data that assigns an identifier to an object based upon a reading sequence of the object.

22. The method for reading bar code symbols, as recited in claim 16, wherein the step of obtaining an identifier for the object further comprises the step of:
    encoding the identifier in a bar code symbol disposed on the object; and
    reading the encoded bar code symbol.

23. The method for reading bar code symbols, as recited in claim 18, wherein the encoded bar code symbol is a first bar code within a field of view of a scanner.

24. A method for reading bar code symbols, each bar code symbol being disposed on a component of an object, the method comprising the steps of:
    storing a plurality of reading gate locations, each reading gate location defining a specific reading gate area surrounding a bar code symbol on the object;
    storing lookup data relating the object to a configuration defining a correspondence between each said reading gate area on the object and a specific component on the object;
    reading each bar code symbol on the object in accordance with the stored reading gate locations, thereby avoiding a search of an entire image for the bar code symbols;
    obtaining an identifier for the object;
    relating each read bar code symbol to a component based on the object identifier and the stored lookup data.

* * * * *